(12) United States Patent
Roth

(10) Patent No.: US 8,211,589 B2
(45) Date of Patent: Jul. 3, 2012

(54) WATER TRANSPORT FEATURES FOR DIFFUSION MEDIA

(75) Inventor: Joerg Roth, Trebur (DE)

(73) Assignee: GM Global Technology Operations LLC

( * ) Notice: Subject to any disclaimer, the term of this patent is extended or adjusted under 35 U.S.C. 154(b) by 1923 days.

(21) Appl. No.: 11/242,737

(22) Filed: Oct. 4, 2005

(65) Prior Publication Data

US 2007/0077484 A1 Apr. 5, 2007

(51) Int. Cl.
*H01M 10/0565* (2010.01)
(52) U.S. Cl. ......... 429/492; 429/457; 429/450; 429/534
(58) Field of Classification Search .......................... None
See application file for complete search history.

(56) References Cited

U.S. PATENT DOCUMENTS

| 6,521,369 B1 * | 2/2003 | Mercuri et al. ................. 429/40 |
| 2003/0209428 A1 * | 11/2003 | Hirahara et al. ............... 204/294 |
| 2005/0026018 A1 * | 2/2005 | O'Hara et al. .................. 429/34 |
| 2006/0177727 A1 * | 8/2006 | Ruth et al. ....................... 429/44 |

FOREIGN PATENT DOCUMENTS

| EP | 0846347 B1 | 6/2000 |
| WO | WO 2004/059770 | * 7/2004 |

* cited by examiner

*Primary Examiner* — Barbara Gilliam
(74) *Attorney, Agent, or Firm* — Harness, Dickey & Pierce, P.L.C.

(57) ABSTRACT

A diffusion media for use in a fuel cell stack and that is adjacently aligned with lands of a reactant plate of the fuel cell stack. The diffusion media includes a sheet having a permeable material with a thickness. A plurality of water transport pores are defined through the sheet. Each of the pores has a pore diameter that is greater than 1.5 times the thickness.

9 Claims, 5 Drawing Sheets

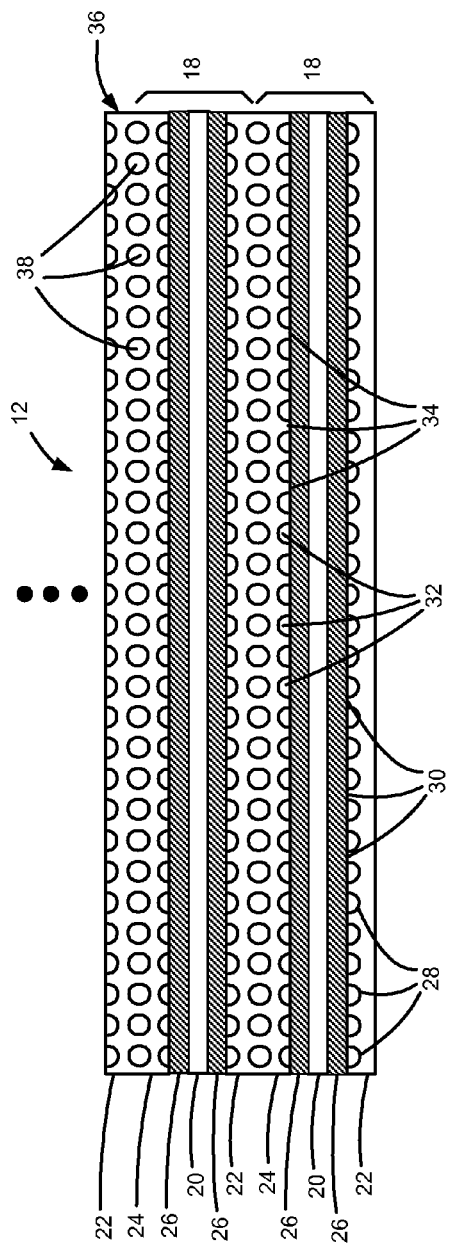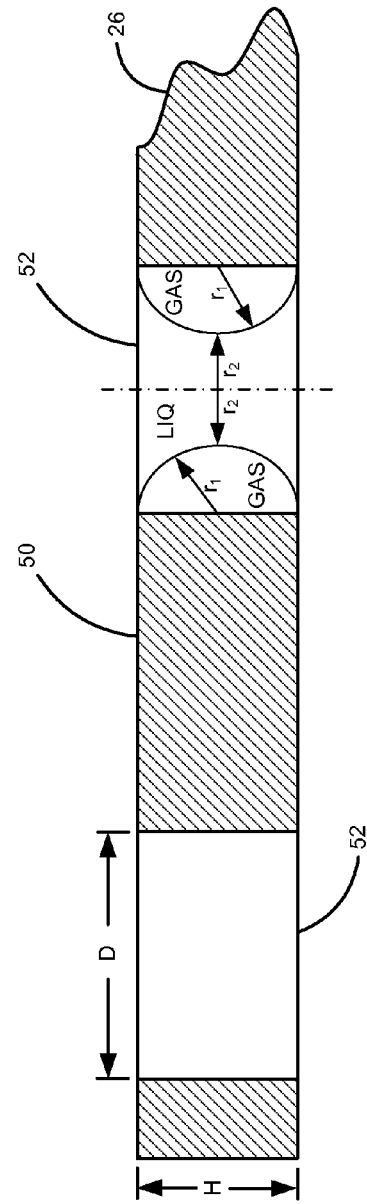
*Figure 1*
*Figure 2*

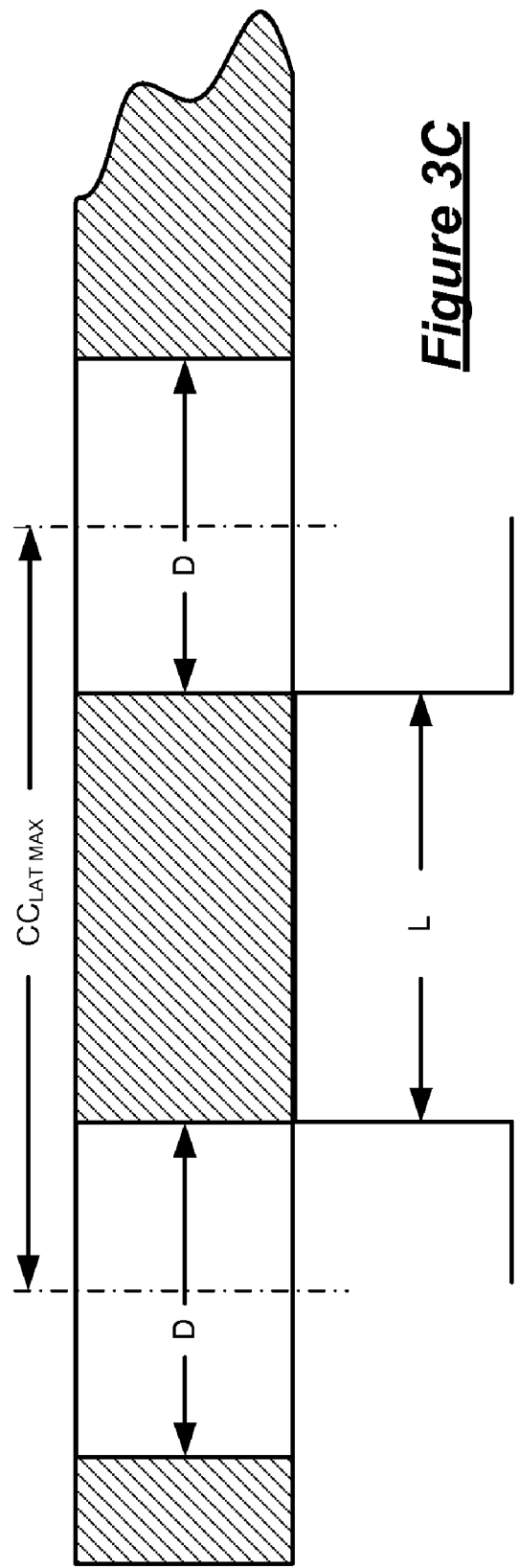

WATER TRANSPORT FEATURES FOR DIFFUSION MEDIA

FIELD OF THE INVENTION

The present invention relates to fuel cells, and more particularly to enhancing liquid water transport through diffusion media of a fuel cell.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell system to provide the proper operating conditions.

The fuel cell stack includes multiple fuel cells electrically connected in series. Each fuel cell includes a polymer electrolyte membrane (PEM) sandwiched between a cathode plate and an anode plate. Electrically conductive diffusion media are disposed between the PEM and both the cathode and anode plates. The cathode plate includes cathode flow channels, through which the oxidant feed gas flows. Similarly, the anode plate includes anode flow channels, though which the hydrogen feed gas flows. The cathode and anode flow channels are open to the diffusion media to enable diffusion of the oxidant and hydrogen feed gases to the PEM.

As the oxidant stream travels through the fluid flow channels of the reactant plates, the stream absorbs water that is produced as the product of the electrochemical reaction. The product water is absorbed either as water vapor or as entrained water droplets. As a result, an initial portion of the flow field is dryer than a latter portion (e.g., just prior to being exhausted from the fuel cell). In the latter portion, the oxidant stream can become saturated with water and two phase flow occurs. More specifically, the oxidant stream contains water vapor and liquid water entrained in the oxidant stream.

Wet and dry regions of the flow field can detrimentally affect fuel cell performance and accelerate the degradation of performance over time. Fuel cell performance is defined as the voltage output from the cell for a given current density. Control of water transport through the cathode-side diffusion media to the oxidant flow channels is important to optimizing fuel cell performance.

SUMMARY OF THE INVENTION

Accordingly, the present invention provides a diffusion media for use in a fuel cell stack and that is adjacently aligned with lands of a reactant plate of the fuel cell stack. The diffusion media includes a sheet having a permeable material with a thickness. A plurality of water transport pores are defined through the sheet. A portion of the pores designated for water transport has a pore diameter that is greater than 1.5 times the thickness. Another portion has a much smaller pore diameter and is used for gas and vapor transport.

In one feature, a pair of adjacent pores includes a center to center distance that is greater than a difference of a width of an adjacent land and the pore diameter and that is less than a sum of the width and the pore diameter.

In another feature, a pair of adjacent pores includes a center to center distance equal to a width of an adjacent land.

In another feature, the plurality of water transport pores include a first pair of adjacent pores having a first center to center distance and a second pair of adjacent pores having a second center to center distance that is different than the first center to center distance.

In another feature, the plurality of water transport pores include a first pore having a first pore diameter and a second pore having a second pore diameter that is different than the first pore diameter.

In other features, a first pore and a second pore of the plurality of water transport pores include a first center to center distance along: a lateral axis of the diffusion media. The first pore and a third pore of the plurality of pores include a second center to center distance along a longitudinal axis of the diffusion media. Also, the location of the pore on top of a land area where the axis of the pore aligns with the axis of the land area can also be beneficial.

In still another feature, the material includes a carbon fiber paper.

In yet another feature, the material includes a carbon-based cloth. Also, cloth, felt, and paper including metals or electrically conductive polymers can be used.

Further areas of applicability of the present invention will become apparent from the detailed description provided hereinafter. It should be understood that the detailed description and specific examples, while indicating the preferred embodiment of the invention, are intended, for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic cross-sectional view of an exemplary fuel cell stack;

FIG. 2 is a detailed schematic cross-sectional view of diffusion media of the fuel cell stack including pores according to the principles of the present invention;

FIG. 3C is a schematic cross-sectional view of the diffusion media illustrating a maximum center-to-center distance between pores;

DETAILED DESCRIPTION OF THE PREFERRED EMBODIMENTS

Figure 3A:
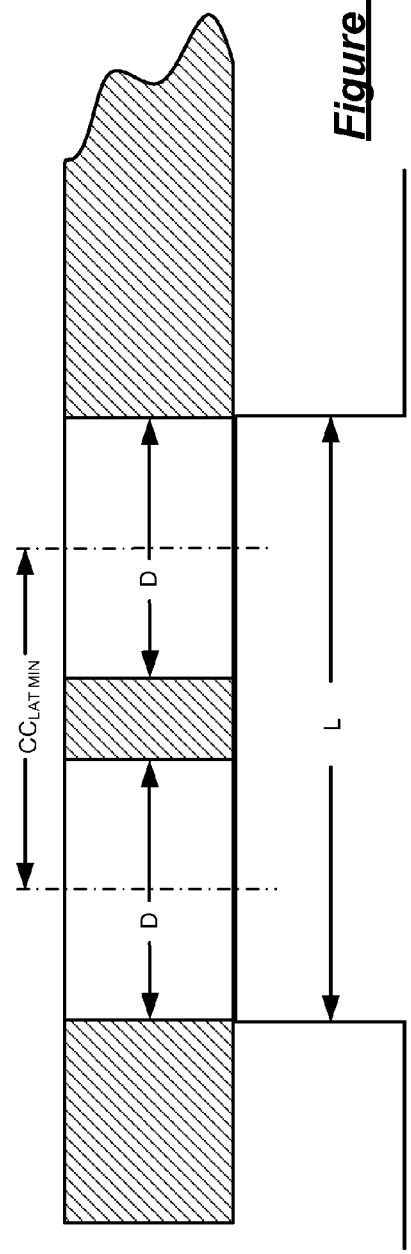
FIG. 3A is a schematic cross-sectional view of the diffusion media illustrating a minimum center-to-center distance between pores.

The following description of the preferred embodiments is merely exemplary in nature and is in no way intended to limit the invention, its application, or uses.

Referring now to FIG. 1, a portion of an exemplary fuel cell stack 12 includes multiple fuel cells 18 electrically connected in series. Each fuel cell 18 includes a polymer electrolyte membrane (PEM) 20 sandwiched between a cathode plate 22 and an anode plate 24. Electrically conductive diffusion media 26 are disposed between the PEM 20 and both the cathode and anode plates 22,24. The diffusion media 26 on the cathode and anode sides can be the same or different. The cathode plate 22 includes cathode flow channels 28, through which the oxidant feed gas flows. The cathode flow channels 28 define raised portions or lands 30 that divide the cathode flow channels 28. Similarly, the anode plate 24 includes anode flow channels 32, though which the hydrogen feed gas flows. The anode flow channels 32 define raised portions or lands 34 that divide the anode flow channels 32.

The diffusion media 26 rest on and are in electrical communication with the lands 30,34 disposed between the cathode and anode flow channels 28,32, respectively. The cathode and anode flow channels 28,32 are open to the diffusion media 26 to enable diffusion of the oxidant and hydrogen feed gases to the PEM 20. In some instances, a bipolar plate 36 is implemented within the fuel cells 18 and includes the cathode flow channels 28 formed on one side for supplying the oxidant feed gas to one PEM 20. The anode flow channels 32 are formed on a second side for supplying the hydrogen feed gas to an adjacent PEM 20. Coolant flow channels 38 are formed through the bipolar plate 36 and facilitate coolant flow through the fuel cell 18.

Referring now to FIG. 2, the diffusion media 26 include a sheet 50 of permeable, electrically conductive material including, but not limited to carbon fiber paper and carbon cloth. It is anticipated, however, that material can include cloth, felt and or paper having electrically conductive materials therein (e.g., metals and/or electrically conductive polymers). A plurality of water transport pores 52 are formed through the sheet 50. The diffusion media 26 are water repellant and porous. It is appreciated that the diffusion media 26 is intrinsically porous and includes reactant transport pores (not shown) that enable reactant flow through the diffusion media 26. Pressure is required to enable water to permeate therethrough. This pressure is the capillary pressure, which is determined according to the following equation:

$$p_c = \sigma \cdot \cos\Theta \cdot \frac{2}{r} \quad (1)$$

where $\sigma$ is the surface tension of water, $\Theta$ is the contact angle between the water and the diffusion media 26 and r is the pore radius. The larger the pore radius for a given contact angle, the smaller the pressure required to enable water to permeate through the pore. However, if the pore radius is too large, heat transfer from the catalyst layer towards the reactant plates 22,24 is inhibited. In this case hot spots can form that are detrimental to the PEM 20, resulting in gas cross-over, decreased efficiency and performance. Furthermore, larger pores 52 are filled with water first, interrupting gas transport in that area.

The present invention defines optimal pore sizes (i.e., pore diameter (D) and height (H)) to provide safe and efficient water transport from the fuel cells 18 and with the smallest amount of energy possible, without compromising other design features. More specifically, water is able to form stable connections between wetting areas if contact angles and the distance between the wetting areas are optimized. Therefore, Equation 1 is special case of the Young-Laplace equation, which is provided as:

$$p_c = \sigma \cdot \cos\Theta \cdot \left(\frac{1}{r_1} + \frac{1}{r_2}\right) \quad (2)$$

$r_1$ and $r_2$ are defined in FIG. 2. The signs of the radii are determined based on the curvature of the liquid surface. In the case of a convex surface, the sign is positive. In the case of a concave surface, the sign is negative. Therefore, $r_1$ is negative and $r_2$ is positive as shown in FIG. 2.

In the case where $r_1$ is equal to $r_2$, the capillary pressure is zero. In other words, no pressure is required to stabilize the liquid connection through the pore 52 and much less pressure is required to enable liquid water transport therethrough. In order to enable this condition, the diameter of the pore is defined as follows:

$$D \geq 1.5H \quad (3)$$

For example, for a diffusion media having a thickness of 200 μm (i.e., H=200 μm), the diameter should be 300 μm or greater. When the criterion of vanishing capillary pressure is fulfilled, the shape is stable and a permanent water transport path is provided. More specifically, the water is transported through the pore across a catanoidal-shaped gaseous ring, defined by $r_1$.

Figure 3B:
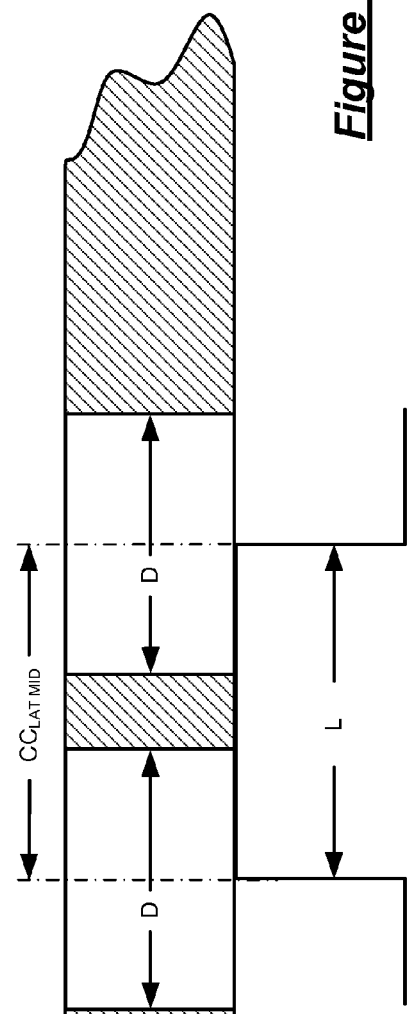
FIG. 3B is a schematic cross-sectional view of the diffusion media illustrating a mid center-to-center distance between pores.

Referring now to FIG. 3A to 3C, a lateral center-to-center ($CC_{LAT}$) distance along a lateral axis (X) between adjacent pores (i.e., transverse to or across the lands 30,34) will be discussed in detail. A longitudinal CC distance ($CC_{LON}$) along a longitudinal axis (Y) is defined parallel to or along the lands 30,34, as shown in FIG. 5C. A range of $CC_{LAT}$ distances is defined relative to a thickness (L) of adjacent lands 30,34. More specifically, a minimum $CC_{LAT}$ distance ($CC_{LATMIN}$) is defined as the difference between L and D (see FIG. 3A). A mid CC distance ($CC_{LATMID}$) is equal to L (see FIG. 3B) and a maximum CC distance ($CC_{LATMAX}$) is equal to the sum of L and D (see FIG. 3C). It is preferred, however, that at least a portion of each pore partially align with a channel (i.e., is not blocked by a land). Therefore, the desired range of $CC_{LAT}$ distances is characterized by the following equation:

$$L-D < CC_{LAT} < L+D \quad (4)$$

It is anticipated that the pore can be located on top of the land where the axis of the pore aligns with an axis of the land.

Figure 4:
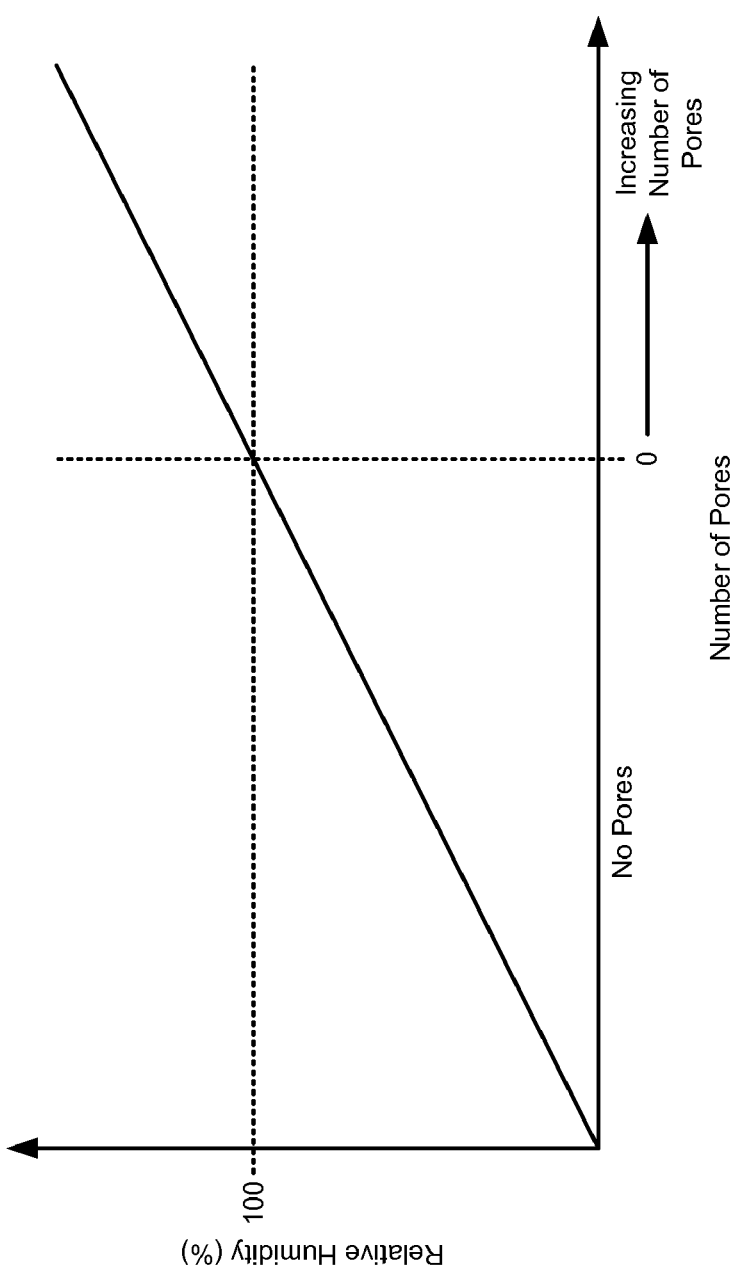
FIG. 4 is a graph illustrating a relationship between relative humidity and the pore density of the diffusion media.

Referring now to FIG. 4, a pore density (PD) is defined as the number of pores per unit area of the diffusion media. The PD varies based on the relative humidity (RH) of the fluid traveling through the diffusion media. More specifically, if the RH is less than 100%, there is no liquid water and no pores are required. However, as the RH increases over 100%, the PD increases. That is to say, an increased amount of liquid in a specific area requires an increased number of pores to enable transport of that liquid from the fuel cell.

Figure 5A:
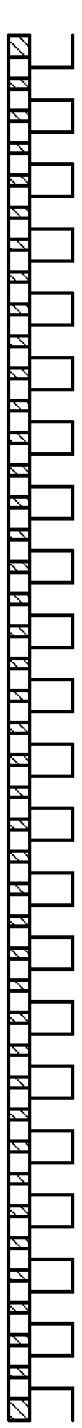
FIGS. 5A-5D are schematic cross-sectional views illustrating varying pore densities across axes of the diffusion media.
Figure 5B:
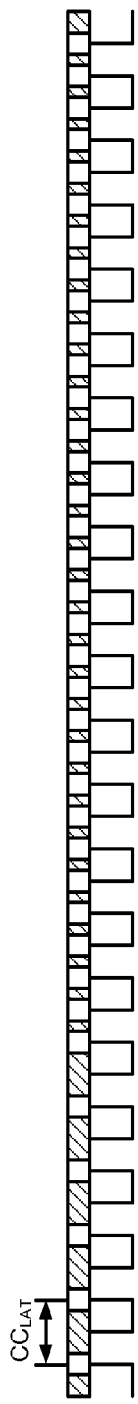
Figure 5C:
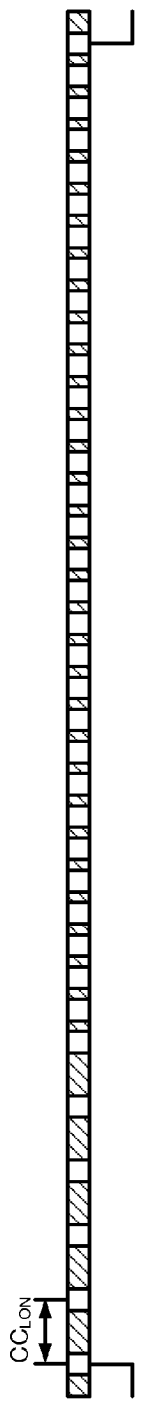
Figure 5D:
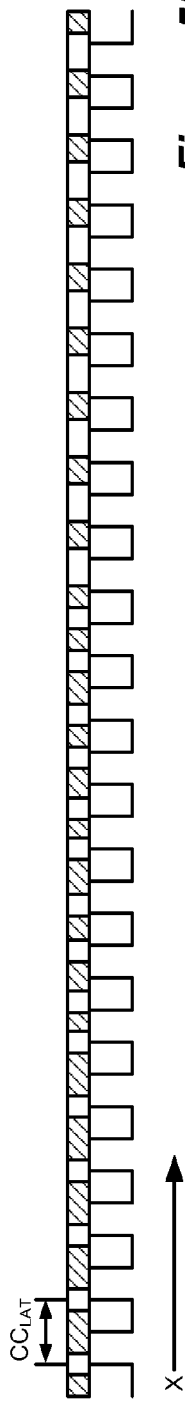

Referring now to FIGS. 5A through 5D, it is anticipated that the diffusion media can include a uniform PD across its entire area or varying PD's and even pore diameters. With particular reference to FIG. 5A, a uniform PD provides an equivalent number of pores per unit area. It is also anticipated, however, that the PD can vary across the diffusion media. For example, if a particular area of the diffusion media is known to have a lower RH than another area, the PD in the lower RH area is less than the PD in the higher RH area. With particular reference to FIGS. 5B and 5C, the PD can vary along both the X axis and the Y axis. With particular reference to FIG. 5D, it is further anticipated that both the PD across the diffusion media and the pore diameter D can vary. More specifically, pores in a higher RH area can have a larger diameter and/or PD than pores in a lower RH area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell, comprising:
a polymer electrolyte membrane (PEM);
a reactant plate having a plurality of lands and channels formed therein; and
a diffusion media that is disposed between said PEM and said reactant plate adjacent to said lands and that comprises a sheet including a permeable material having a thickness and a plurality of water transport pores defined through said sheet, each of said pores having a pore diameter that is greater than 1.5 times said thickness, wherein at least a portion of each of said pores partially align with one of said channels.

2. The fuel cell of claim 1 wherein a pair of adjacent water transport pores includes a center to center distance that is greater than a difference of a width of an adjacent land and said pore diameter and that is less than a sum of said width and said pore diameter.

3. The fuel cell of claim 1 wherein a pair of adjacent water transport pores includes a center to center distance equal to a width of an adjacent land.

4. The fuel cell of claim 1 wherein said plurality of water transport pores include a first pair of adjacent pores having a first center to center distance and a second pair of adjacent pores having a second center to center distance that is different than said first center to center distance.

5. The fuel cell of claim 1 wherein said plurality of water transport pores include a first pore having a first pore diameter and a second pore having a second pore diameter that is different than said first pore diameter.

6. The fuel cell of claim 1 wherein a first pore and a second pore of said plurality of water transport pores include a first center to center distance along a lateral axis of said diffusion media.

7. The fuel cell of claim 6 wherein said first pore and a third pore of said plurality of water transport pores include a second center to center distance along a longitudinal axis of said diffusion media.

8. The fuel cell of claim 1 wherein said material includes carbon based paper, felt, or cloth.

9. The fuel cell of claim 1 wherein said material includes a paper, felt, or cloth containing metal or electrically conductive polymer.

* * * * *